United States Patent [19]

McManigal et al.

[11] Patent Number: 5,065,788
[45] Date of Patent: Nov. 19, 1991

[54] ACCURATE HIGH-FLOW CLEAN REGULATOR WITH INPUT-PRESSURE BALANCING

[76] Inventors: Paul G. McManigal, 16 Inverness La., Newport Beach, Calif. 92660; Philip A. Vaughan, 1540 S. Bellwood Rd., San Marino, Calif. 91108

[21] Appl. No.: 621,754

[22] Filed: Dec. 4, 1990

[51] Int. Cl.⁵ ............................................. G05D 16/06
[52] U.S. Cl. ......................... 137/505.18; 137/505.11; 137/505.42
[58] Field of Search ................. 137/505.11, 505.13, 137/505.15, 505.18, 505.42

[56] References Cited

U.S. PATENT DOCUMENTS

| | | |
|---|---|---|
| 123,771 | 2/1872 | Deck . |
| 476,755 | 6/1892 | Mills . |
| 796,959 | 8/1905 | Croslen . |
| 815,912 | 3/1906 | Eddy ............................... 137/505.18 |
| 880,402 | 2/1908 | Reynolds . |
| 1,178,528 | 4/1916 | Loepsinger . |
| 1,525,426 | 2/1925 | Mueller et al. . |
| 2,039,587 | 5/1936 | Emanueli . |
| 2,091,051 | 8/1937 | Mesinger . |
| 2,599,577 | 6/1952 | Norgren . |
| 2,650,455 | 9/1953 | Jacobsson et al. . |
| 2,707,966 | 5/1955 | Taplin ......................... 137/505.18 X |
| 2,739,611 | 3/1956 | Cornelius ................... 137/505.18 X |
| 2,960,107 | 11/1960 | Falconer . |
| 3,025,873 | 3/1962 | Ray . |
| 3,035,608 | 5/1962 | Ray . |
| 3,189,043 | 6/1965 | Stadler . |
| 3,276,470 | 10/1966 | Griffing . |
| 3,282,285 | 11/1966 | Hanson et al. . |
| 3,433,262 | 3/2969 | Ray . |
| 3,485,259 | 12/1969 | Ulbing . |
| 3,545,471 | 12/1970 | Taplin . |
| 3,873,063 | 3/1975 | Illing . |
| 3,926,208 | 12/1975 | Hoffman et al. . |
| 4,256,138 | 3/1981 | Chapman . |
| 4,666,166 | 5/1987 | Hart et al. ........................ 137/510 X |
| 4,744,387 | 5/1988 | Otteman . |
| 4,776,367 | 10/1988 | Hilmersson et al. . |

FOREIGN PATENT DOCUMENTS

| | | |
|---|---|---|
| 6819 | 10/1879 | Fed. Rep. of Germany .................... 137/505.18 |
| 1200155 | 12/1959 | France . |
| 555317 | 1/1957 | Italy . |

*Primary Examiner*—Stephen M. Hepperle
*Attorney, Agent, or Firm*—William W. Haefliger

[57] ABSTRACT

A high pressure gas regulator, the combination comprising an axially movable poppet and an orifice controlled by the poppet in response to poppet axial movement, the orifice having upstream and downstream sides; a main diaphragm responsive to gas pressure at the downstream side of the orifice and operatively connected with the poppet to control poppet movement toward or away from the orifice in response to an increase or decrease in pressure at the downstream side of the orifice, respectively; auxiliary pressure responsive structure at the upstream side of the orifice to control the poppet position with respect to the orifice, moving the poppet and orifice together or apart in response to a decrease or increase in pressure at the upstream side of the orifice, respectively; and housing structure enclosing the poppet, orifice, main diaphragm, and auxiliary pressure responsive structure.

23 Claims, 4 Drawing Sheets

ACCURATE HIGH-FLOW CLEAN REGULATOR WITH INPUT-PRESSURE BALANCING

BACKGROUND OF THE INVENTION

This invention relates generally to fluid pressure regulators, and more particularly has to do with high pressure gas regulators wherein high side pressure and flow can considerably affect regulation.

In a fluid pressure regulator, a diaphragm is commonly placed at the downstream side of an orifice controlled by a poppet or stopper. If the exit (regulated) pressure drops, the diaphragm senses the drop and moves the poppet in an orifice-opening direction to compensate for the pressure drop by increasing the flow through the orifice, and vice versa. However, such regulators are found to be undesirably sensitive to variations in supply pressure, i.e., input pressure supplied to the orifice at the high pressure side. For example, an increase in supply pressure can be communicated through the orifice, and to the poppet, to cause the diaphragm and poppet to move in orifice-closing direction, undesirably reducing the regulated pressure (output pressure accuracy). Also, O-rings and pistons used in regulators can contaminate the fluid passing through them.

There is need for improvements in regulators overcoming the above problem in a very simple and effective manner.

SUMMARY OF THE INVENTION

It is a major object of the invention to provide an improved regulator in which the above needs are met. Basically, the high pressure fluid regulator of the invention comprises:

a) an axially movable poppet and an orifice controlled by the poppet in response to poppet axial movement, the orifice having upstream and downstream sides, b) a main diaphragm responsive to gas pressure at the downstream side of the orifice and operatively connected with the poppet to control poppet movement toward or away from the orifice in response to an increase or decrease in pressure at the downstream side of the orifice, respectively, c) auxiliary pressure responsive means at the upstream side of the orifice to control the relative motion of the poppet and orifice toward or away from each other in response to a decrease or increase in pressure at the upstream side of the orifice, respectively, d) and housing means enclosing the poppet, orifice, main diaphragm, and auxiliary pressure responsive means.

By "high pressure" is meant, for example, fluid or gas pressure in the range 200 to 10,000 psi.

It is another object of the invention to provide auxiliary pressure responsive means in the form of a diaphragm, or a bellows, operatively connected with the poppet.

Another object is to provide said auxiliary pressure responsive means in the form of an annular, yieldably flexible diaphragm carrying the orifice.

Another object of the invention is to provide a poppet or stopper mounted to "float" axially, as between a range spring associated with the main diaphragm, and a second spring associated with the auxiliary diaphragm (or bellows), and out of the fluid flow stream. As will be seen, adjustment means may be operatively connected with the range spring to adjust the tension thereof.

Since the accuracy of the regulation is high, and insensitive to the input pressure, a rather large poppet opening can be used, as compared to the area of the regulator's main diaphragm. This larger opening will in turn afford a higher flow and, therefore, less "droop".

These and other objects and advantages of the invention, as well as the details of an illustrative embodiment, will be more fully understood from the following specification and drawings, in which:

DRAWING DESCRIPTION

DETAILED DESCRIPTION

Figure 1:
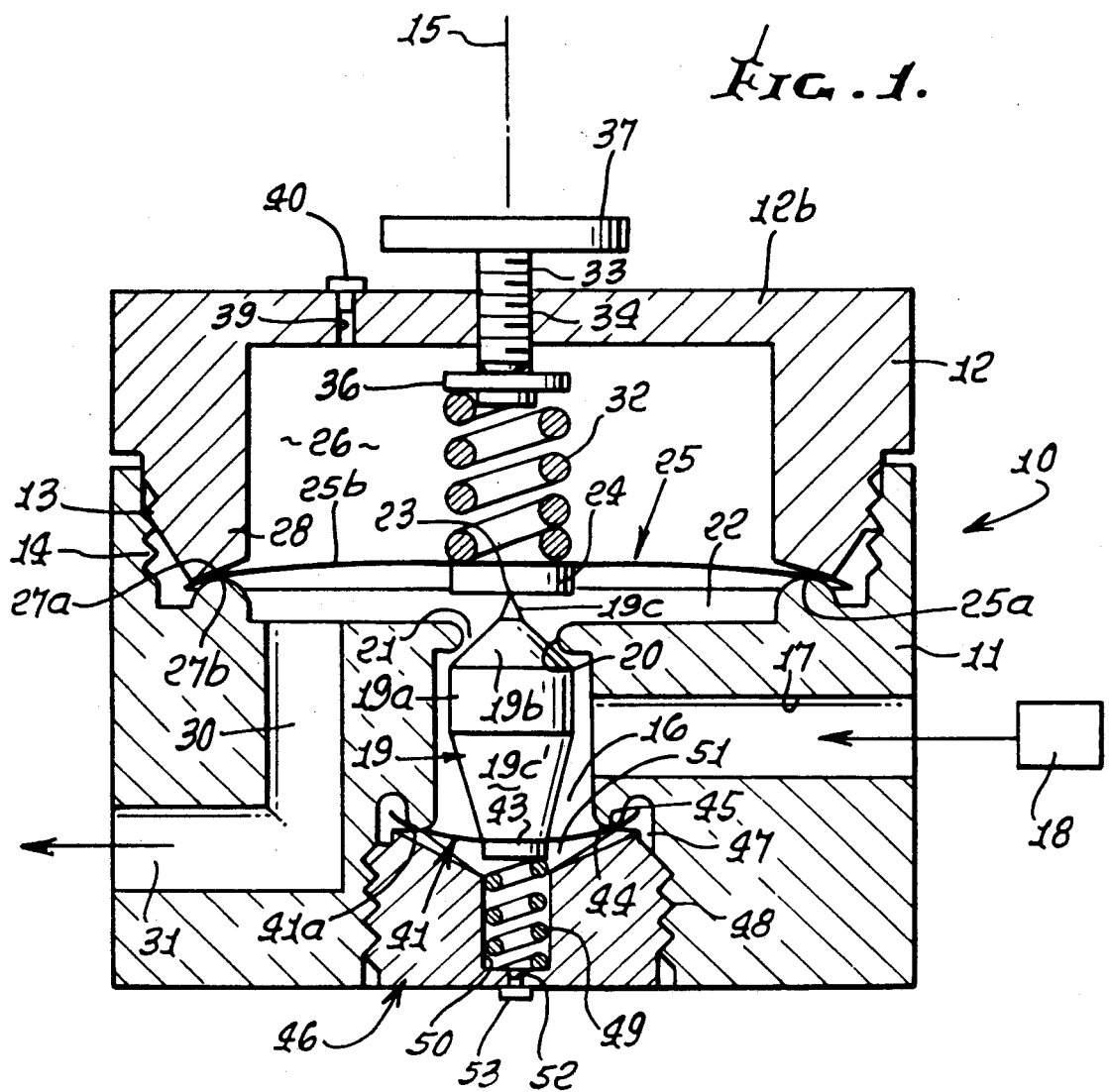
FIG. 1 is a vertical section taken through a regulator embodying the invention.

In FIG. 1, a housing 10 includes a body 11 and a cap 12 connected to the body. As shown, an external pin thread 13 on the cap is connected to the body internal box thread 14. A body and cap common axis is indicated at 15.

The body forms a central vertical passage 16, and a side inlet port 17 communicating with passage 16. A source 18 of inlet fluid, as for example high pressure gas, communicates with inlet port 17. A poppet or stopper 19 is positioned in passage 16 to move vertically or axially therein, relative to an annular seat 20, for controlling fluid flow through an orifice 21 bounded by the seat. Passage 16 is located at the upstream side of the seat, and the poppet is shown as having a cylindrical section 19a in passage 16, a tapered section 19b extending upwardly through the orifice, into chamber 22 at the downstream side of the seat, and a tapered section 19d extending downwardly. A section 19c may have centering interfit at 23 with a plate 24 carried by a main diaphragm 25.

Diaphragm 25 extends transversely between lower chamber 22 and an upper chamber 26 within the cap 12. Its annular outer portion 25a is retained between annular lip 27a on the body 11, and downwardly facing annular nose 27b of the cap skirt 28. Lip 27a may be upwardly convex, as shown, to accommodate up and down of movement of the diaphragm central extent 25b at or proximate plate 24. Nose 27 is frusto-conical, as shown, to urge the diaphragm outer portion 25a toward the convex lip 27a, while accommodating to the shallow, upwardly convex configuration of the diaphragm 25. The latter may be metallic, for example. The main diaphragm 25 is responsive to gas pressure at the downstream side of the orifice 21 and operatively connected with the poppet 19 to control poppet movement toward or away from the orifice 21 in response to an increase or decrease in pressure at the downstream side of the orifice, respectively.

The body 11 also forms outlet port 30 and 31 communicating between chamber 22, and the exterior, whereby fluid such as gas that passes through the orifice 21 into chamber 22 exits the latter at regulated pressure via 30 and 31. The level of regulated pressure at outlet 31 may be controlled as by range spring 32 operatively connected with the main diaphragm 25 to yieldably urge the main diaphragm 25 toward the orifice 21. Range spring 32 may be a coil spring, as shown, and adjustment means is operatively connected with the range spring 32 to adjust the tension thereof. Such adjustment means may include an adjusting screw 33 thread connected at 34 to the cap top wall 12b, and extending between a support plate 36 for the top end of the range spring 32, and an adjustment knob 37. If the knob 37 is rotated in one direction, the regulated pressure is increased, and if the knob 37 is rotated in the opposite direction, the regulated pressure is decreased. Upper chamber 26 may be vented to the exterior, as at 39 for example, by removal of a plug 40.

In accordance with an important aspect of the invention, auxiliary pressure responsive means is provided at the upstream side of the orifice to control poppet 19 movement toward or away from the orifice 21 in response to a decrease or increase in pressure at the upstream side of the orifice, respectively.

As shown, the auxiliary pressure responsive means comprises an auxiliary diaphragm 41 connected with the poppet 19 and extended transversely of passage 16. See for example the connection at 43, at the lower end of the poppet 19 downwardly tapered section 19d. As illustrated, the diaphragm is downwardly convex, and its upper side is exposed to the upstream (high-side) pressure of fluid in passage 16. Accordingly, during operation, the effect of an input pressure increase, which would in general act to close the poppet 19 (by transmission through the orifice 21 to displace diaphragm 25 upwardly) is offset by the downward action of pressure increase against the auxiliary diaphragm 41, and vice versa. Accordingly, the poppet position is less effected by such changes or variations in input pressure. This configuration is particularly of advantage where the orifice is large, in order to accommodate a relatively large gas flow rate. "Droop" effects are thus minimized.

Note that the outer annular extent 41a of the diaphragm 41 is retained between downwardly convex annular lip 44 of body 11, and an upward annular nose 45 on a plug 46 threaded into the body recess 47 at 48. A coil spring 49 retained in a central well 50 in the plug 4 is operatively connected with the poppet 19 to yieldably urge the poppet 19 toward the orifice 21. Accordingly, the poppet "floats" between the two springs 49 and 32, and the diaphragms 41 and 25. Well 50 and the space 51 directly under diaphragm 41 may be vented as at 52, as by removal of the plug 53. Access to the poppet 19, diaphragm 41 and spring 49 may be gained by removal of the plug 46 for cleaning or other purposes.

In this regard, the apparatus does not require a non-metallic O-ring at the poppet, so that the risk of fluid stream contamination as might result from degradation of such an O-ring is eliminated.

Figure 2:
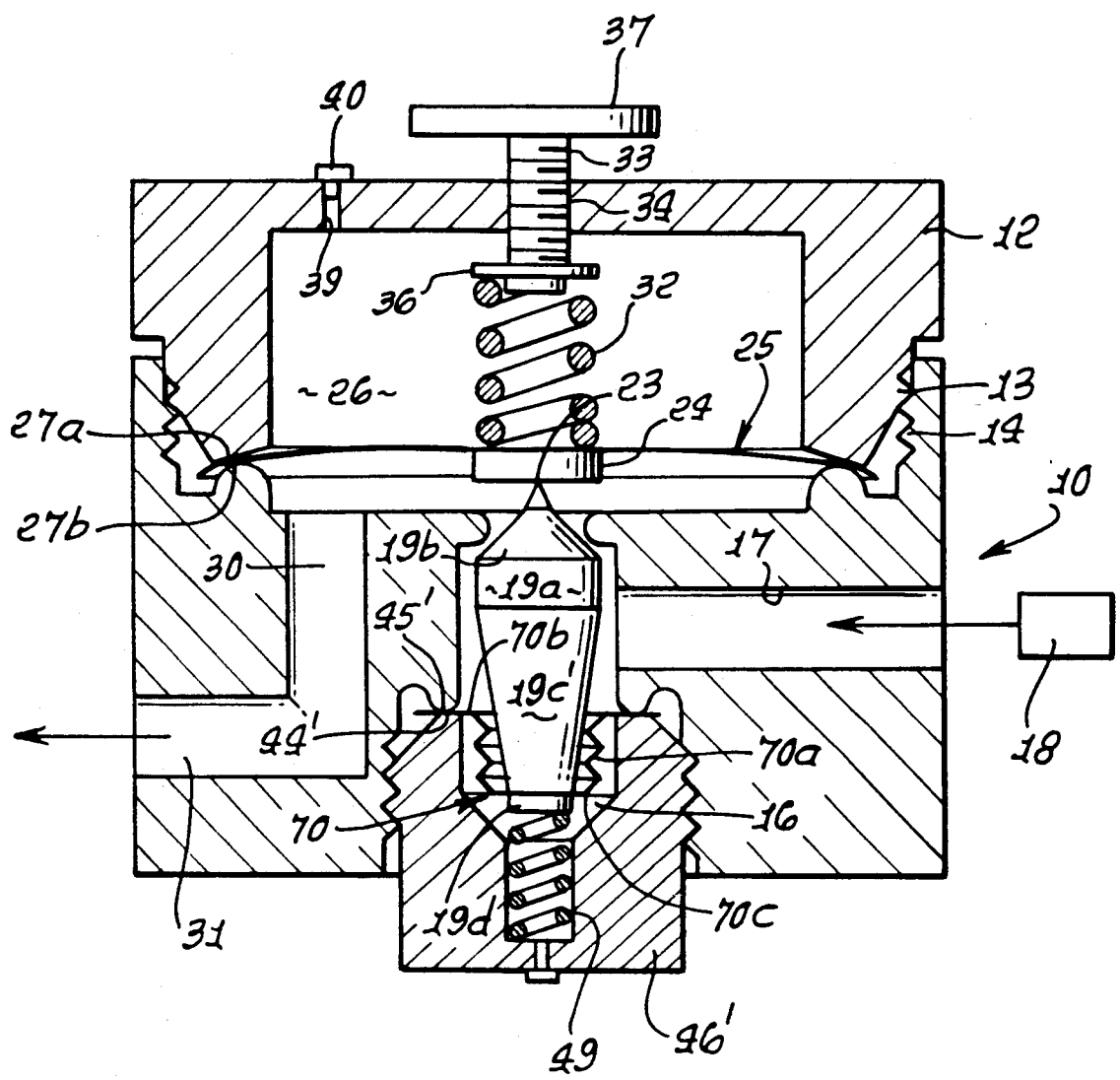
FIG. 2 is a view like FIG. 1, but showing a modified regulator.

FIG. 2 shows another form of the regulator, in which elements the same as those in FIG. 1 bear the same identifying numerals. A bellows 70 is employed instead of the diaphragm 41. See bellows skirt 70a extending vertically adjacent the vertically extended tapered extent 19d of the poppet. Bellows flange 70b is retained between convex lip 44', and upwardly facing horizontal nose 45' on plug 46'. The bellows lower end wall 70c is attached to the lower end portion 19e of the poppet.

Figure 3:
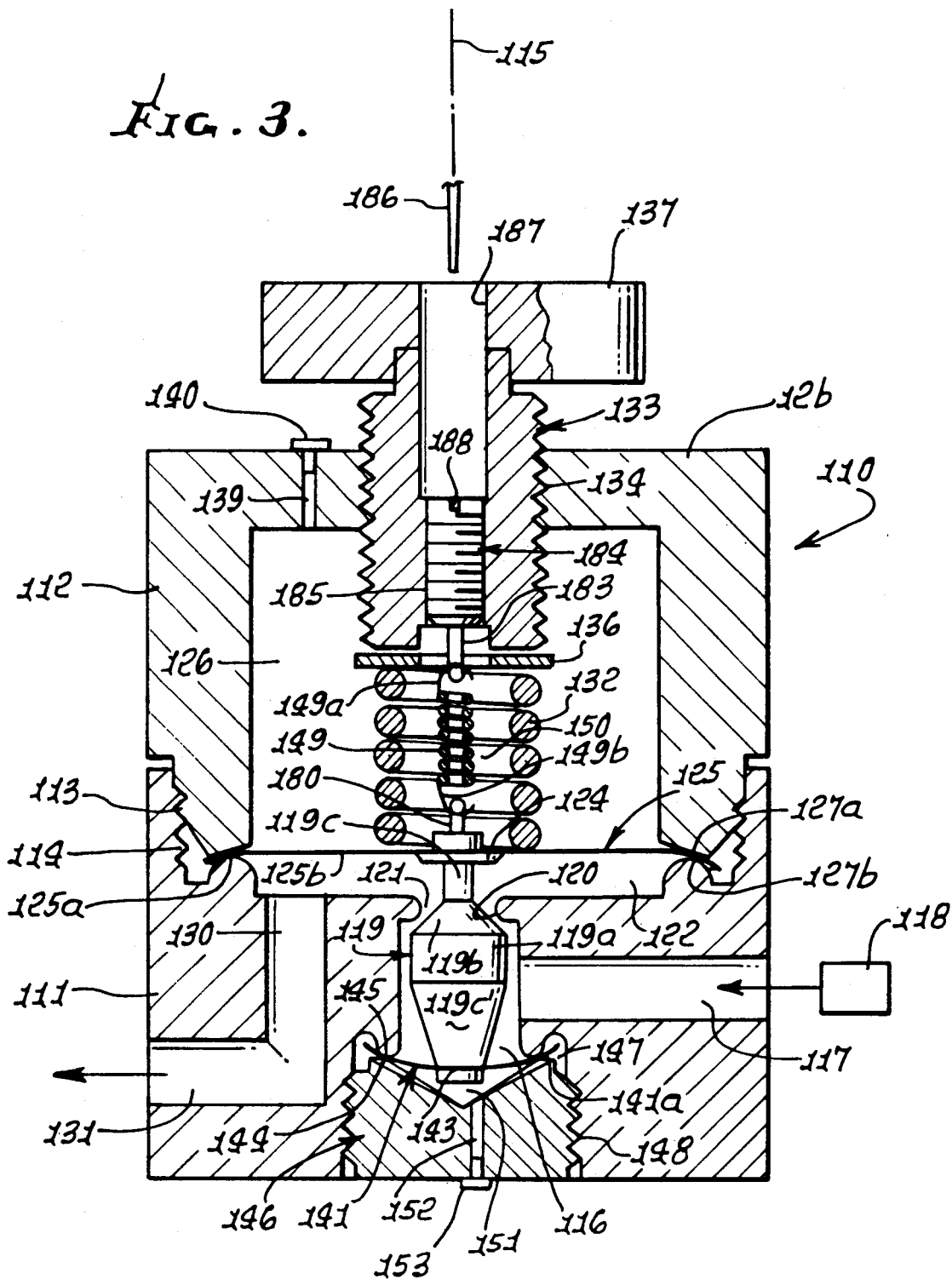
FIG. 3 is another view like FIG. 1 showing a further modified regulator.

In FIG. 3, a housing 110 includes a body 111 and a cap 112 connected to the body 111. As shown, an external pin thread 113 on the cap 112 is connected to the body internal box thread 114. A body 111 and cap 112 common axis is indicated at 115.

The body forms a central vertical passage 116, and a side inlet port 117 communicating with passage 116. A source 118 of inlet fluid, as for example high pressure gas, communicates with inlet port 117. A poppet or stopper 119 is positioned in passage 116 to move vertically or axially therein, relative to an annular seat 120, for controlling fluid flow through an orifice 121 bounded by the seat. Passage 116 is located at the upstream side of the seat, and the poppet is shown as having a cylindrical section 119a in passage 116, a tapered section 119b extending upwardly through the orifice, and a section 119c extending upwardly in chamber 122 at the downstream side of the seat 121. Section 119c may have interfit with a plate 124 carried by a main diaphragm 125. A poppet downwardly tapered section 119 extends downwardly in passage 116.

Diaphragm 125 extends transversely between lower chamber 122 and an upper chamber 126 within the cap 112. Its annular outer portion 125a is retained between annular lip 127a on the body 111, and downwardly facing annular nose 127b at the lowermost rim of the cap 112. Lip 127 may be upwardly convex, as shown, to accommodate up and down movement of the diaphragm central extent 125b at or proximate plate 124. Nose 127b is frusto-conical, as shown, to urge the diaphragm outer portion 125a toward the convex lip 127a, while accommodating to the shallow, upwardly convex configuration of the diaphragm 125. The latter may be metallic, for example. The main diaphragm 125 is responsive to gas pressure at the downstream side of the orifice 121 and operatively connected with the poppet 119 to control poppet movement toward or away from the orifice 121 in response to an increase or decrease in pressure at the downstream side of the orifice, respectively.

The body 111 also forms outlet port 130 and 131 communicating between chamber 122, and the exterior, whereby fluid such as gas that passes through the orifice into chamber 122 exits the latter at regulated pressure via 130 and 131. The level of regulated pressure at outlet 131 may be controlled as by range spring 132 operatively connected with the main diaphragm 125 to yieldably urge the main diaphragm 125 toward the orifice 121. Range spring 132 may be a coil spring, as shown, and adjustment means is operatively connected with the range spring 132 to adjust the tension thereof. Such adjustment means may include an adjusting screw 133 thread connected at 134 to the cap top wall 112b, and extending between a support plate 136 for the top end of the range spring 132, and an adjustment knob 137. If the knob 137 is rotated in one direction, the regulated pressure is increased, and if the knob 137 is rotated in the opposite direction, the regulated pressure is decreased. Upper chamber 126 may be vented to the exterior, as at 139 for example, by removal of a plug 140.

In accordance with an important aspect of the invention, auxiliary pressure responsive means is provided at the upstream side of the orifice to control poppet movement toward or away from the orifice in response to a decrease or increase in pressure at the upstream side of the orifice, respectively.

As shown, the auxiliary pressure responsive means comprises an auxiliary diaphragm 141 connected with the poppet and extended transversely of passage 116. See for example the connection at 143, at the lower end of the poppet downwardly tapered section 119d. As illustrated, the diaphragm 141 is downwardly convex, and its upper side is exposed to the upstream (high-side) pressure of fluid in passage 116. Accordingly, during operation, the effect of an input pressure increase, which would in general act to close the poppet (by transmission through the orifice to displace diaphragm 125 upwardly) is offset by the downward action of pressure increase against the auxiliary diaphragm 141, and vice versa. Accordingly, the poppet 119 position is less affected by such changes or variations in input pressure. This configuration is particularly of advantage where the gas flow rate is relatively large. "Droop" effects are thus minimized.

Note that the outer annular extent 141a of the diaphragm 141 is retained between downwardly convex annular lip 144 of body 111, and an upward annular nose 145 on a plug 146 threaded into the body recess 147 at 148.

An auxiliary coil spring 149 is retained in a central zone 150 inwardly of the range spring 132. Spring 149 operates as a tension spring, operatively connected with the poppet 119, as via connection at 180 of the spring 149 and diaphragm 125 to the poppet 119, to yieldably urge the poppet 119 toward the orifice 121. Accordingly, the poppet 119 "floats" axially between the two diaphragms 141 and 125. See the hooked ends 149a and 149b of the auxiliary spring 149. End 149 is connected via a bearing 183 to an adjustment screw 184, internally thread connected at 185 to screw 133. A tool 186 may be inserted into well 187 in 133 to engage a notch 188 in upper end of 184, to rotatably adjust same axially, to adjust the tension in 149. Springs 132 and 149 act differentially.

The space 151 directly under diaphragm 141 may be vented as at 152, as by removal of the plug 153. Access to the poppet and diaphragm 141 may be gained by removal of the plug 146 for cleaning or other purposes.

In this regard, the apparatus does not require a nonmetallic O-ring at the poppet, so that the risk of fluid stream contamination as might result from degradation of such an O-ring is eliminated.

Figure 4:
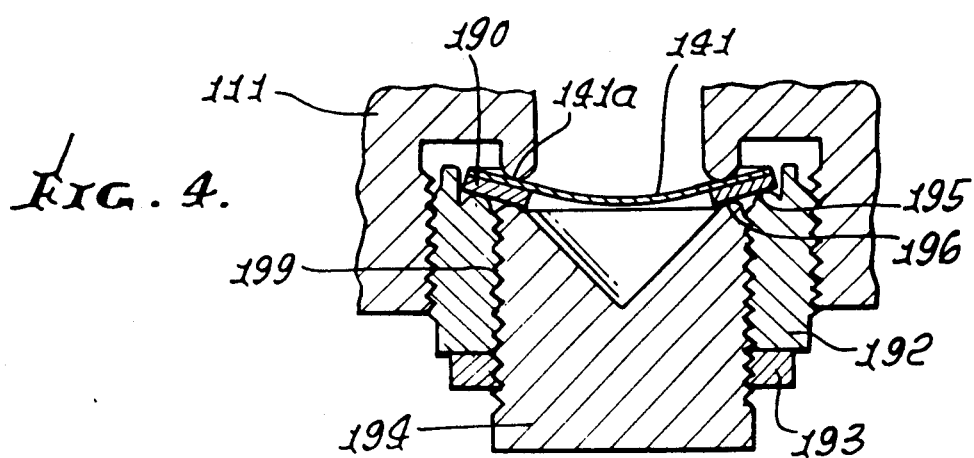
FIG. 4 is an enlarged section showing control of the effective size of the auxiliary diaphragm.

FIG. 4 shows one form of means for controlling the effective size of the auxiliary diaphragm 141 in FIG. 3, to achieve balance. While different embodiments of such means may be provided, one such means comprises a washer (one or more) 190, initially flat or conical, which has an upper surface variably engageable with the diaphragm 141 at circular contact line 141a. Plug assembly 192, 193 and 194 replaces plug 46 or 146 in FIGS. 1, 2 and 3. A carrier 192 carries the washer 190 at variable circular contact line 195 on the toroidal upper surface of the carrier, and an adjustable actuator 194 is positioned for upward displacement, as by rotary threading at 199, to engage the washer at variable circular line 196 of the toroidal upper surface of the actuator 194. The positions of the circular contact lines 195 and 196 are determined by setting the position of the actuator 194 relative to the carrier 192 by means of the threading 199 and lock nut 193. These circular contact lines determine the conical angle taken by washer 190 when the carrier is tightened such that firm contact is achieved at circular contact lines 141a, 195 and 196. This angle determines the variable radius of the circular line 141a, which in turn determines the effective size of the auxiliary diaphragm 141. Other devices to vary the contact point of the diaphragm will be apparent to those skilled in the art.

Figure 5:
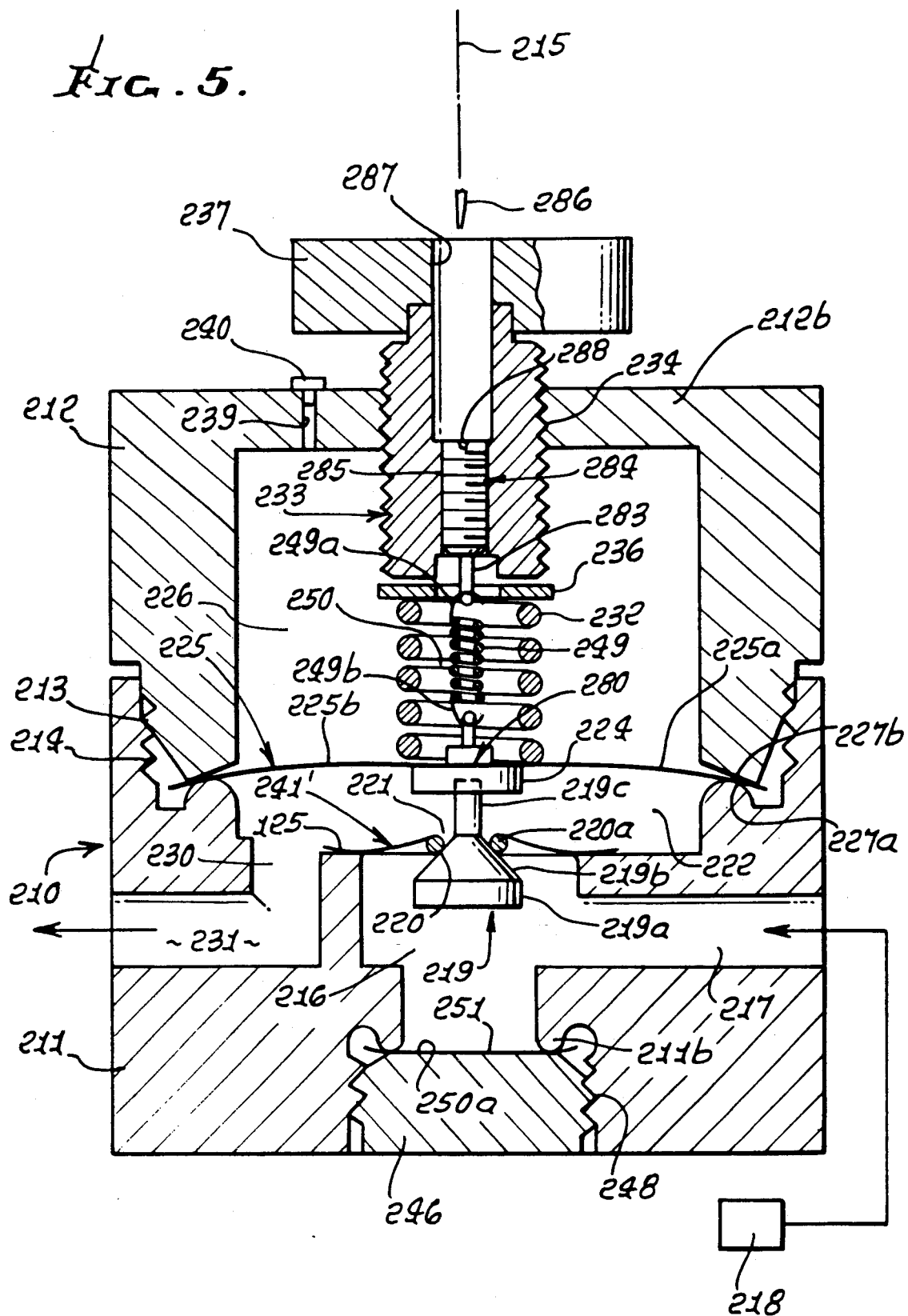
FIG. 5 is another view like FIG. 2 showing a further modified regulator.

In FIG. 5, a housing 210 includes a body 211 and a cap 212 connected to the body. As shown, an external thread 213 on the cap is connected to the body internal thread 214. A body and cap common axis is indicated at 215.

The body forms a central vertical passage 216, and a side inlet port 217 communicating with passage 216. A source 218 of inlet fluid, as for example high pressure gas, communicates with inlet port 217. A poppet or stopper 219 is positioned in passage 216 to move vertically or axially therein, relative to an annular seat 220, for controlling fluid flow through an orifice 221 bounded by the seat. Passage 216 is located at the upstream side of the seat 220, and the poppet 219 is shown as having a cylindrical section 219a in passage 216, a tapered section 219b extending upwardly through the orifice 221, and a section 219c extending upwardly in chamber 222 at the downstream side of the seat 220. Section 219c may have interfit with a plate 224 carried by a main diaphragm 225.

Diaphragm 225 extends transversely between lower chamber 222 and an upper chamber 226 within the cap 212. Its annular outer portion 225a is retained between annular lip 227a on the body, and downwardly facing annular nose 227b at the lowermost rim of the cap skirt or wall. Lip 227a may be upwardly convex, as shown, to accommodate up and down movement of the diaphragm 225 central extent 225b at or proximate plate 224. Nose 227b is frusto-conical, as shown, to urge the diaphragm 225 outer portion 225a toward the convex lip 227a, while accommodating to the shallow, upwardly convex configuration of the diaphragm 225. The latter may be metallic, for example. The main diaphragm 225 is responsive to gas pressure at the downstream side of the orifice 221 and operatively connected with the poppet 219 to control poppet movement toward or away from the orifice 221 in response to an increase or decrease in pressure at the downstream side of the orifice, respectively.

The body 211 also forms outlet port 230 and 231 communicating between chamber 222, and the exterior, whereby fluid such as gas that passes through the orifice 221 into chamber 222 exits the latter at regulated pressure via 230 and 231. The level of regulated pressure at outlet 231 may be controlled as by range spring 232 operatively connected with the main diaphragm 225 to yieldably urge the main diaphragm 225 toward the orifice 221. That spring 232 may be a coil spring, as shown, and adjustment means is operatively connected with the range spring 232 to adjust the tension thereof. Such adjustment means may include an adjusting screw 233 thread connected at 234 to the cap top wall 212b, and extending between a support plate 236 for the top end of the range spring 232, and an adjustment knob 237. If the knob 237 is rotated in one direction, the regulated pressure is increased, and if the knob 237 is rotated in the opposite direction, the regulated pressure is decreased. Upper chamber 226 may be vented to the exterior, as at 239 for example, by removal of a plug 240.

In accordance with an important aspect of the invention, auxiliary pressure responsive means is provided at the upstream side of the orifice to control poppet movement toward or away from the orifice in response to a decrease or increase in pressure at the upstream side of the orifice, respectively.

As shown, the auxiliary pressure responsive means comprises an annular auxiliary diaphragm 241' which carries an orifice ring 220a, defining seat 220. Diaphragm 241' is attached at 125 to body 211. As high-side pressure increases, diaphragm 241' flexes upwardly, carrying the seat 220 away from the poppet 219. Accordingly, during operation, the effect of an input pressure increase, which would in general act to close the poppet 219 (by transmission through the orifice 221 to displace diaphragm 225 upwardly) is offset by upward flexing of the diaphragm 241' (in response to gas pressure increase at 216) increasing the space between the poppet surface 219b and the seat 220. Accordingly, the poppet 219 position relative to the seat 220 is less effected by such changes or variations in input pressure. This configuration is particularly of advantage where the desired gas flow rate is relatively large. "Droop" effects with high flow rates are thus minimized because the orifice can be made relatively large without incurring the usual inaccuracy in output pressure as the input pressure changes.

An auxiliary coil spring 249 is retained in a central zone 250 inwardly of the range spring 232. Spring 249 operates as a tension spring, operatively connected with the poppet 219, as via connection at 280 of the spring 249 and diaphragm 225 to the poppet 219, to yieldably urge the poppet 219 toward the orifice 221. Accordingly, the poppet 219 "floats" axially between the two diaphragms 241' and 225. See the hooked ends 249a and 249b of the auxiliary spring 249. End 249a is connected via a bearing 283 to an adjustment screw 284, internally thread connected at 285 to screw 233. A tool 286 may be inserted into well 287 in screw 233 to engage a notch 288 in upper end of 284, to rotatably adjust same axially, to adjust the tension in spring 249. Springs 232 and 249 act differentially.

Access to the poppet 219 and diaphragm 241' may be gained by removal of the plug 246 for cleaning or other purposes. Plug 246 is thread connected to the body 211 at 248; and an annular seal 251 may be retained between the upper side 250a of 246, and a body annular nose 211b.

In this regard, the apparatus does not require a non-metallic O-ring at the poppet, so that the risk of fluid stream contamination as might result from degradation of such an O-ring is eliminated.

Referring again to the flexing of the seat-carrying diaphragm 241', an upward movement of seat 220, due to an input pressure increase, is also accompanied by lifting of diaphragm 225 and of poppet 219, resisted by a corresponding compression of the range spring 232. Thus, accuracy in the regulated output pressure is maintained.

Both diaphragms 225 and 241' are typically made of metal which is yieldably flexible or springy. Seat 220a may consist of bronze, for example. Corresponding diaphragm and body elements, such as at 25, 41, 11, and 12 in other figures, are also metallic.

I claim:

1. In a high pressure gas regulator, the combination comprising
   a) an axially movable poppet and an orifice controlled by the poppet in response to poppet axial movement, the orifice having upstream and downstream sides,
   b) a metallic main diaphragm responsive to gas pressure at the downstream side of the orifice and having operative connection with the poppet to extend openly proximate the orifice and to control poppet movement toward or away from the orifice in response to an increase or decrease in pressure at the downstream side of the orifice, respectively, the poppet and orifice defining interengageable annular surfaces,
   c) auxiliary pressure responsive means comprising an auxiliary pressure responsive unit defining a pressure sensitive, thin metallic member, at the upstream side of the orifice to control the relative motion of the poppet and orifice toward or away from each other in response to a decrease or increase in pressure at the upstream side of the orifice, respectively,
   d) housing means enclosing said poppet, orifice, main diaphragm, and auxiliary pressure responsive means, said housing means having a gas pressure inlet and a gas pressure outlet, said inlet communicating with the upstream side of the orifice, and said outlet communicating with the downstream side of the orifice,
   e) a poppet spring operatively connected with the poppet to yieldably urge the poppet toward the orifice, said spring located outside the gas flow,
   f) and a range spring operatively connected with the main diaphragm to yieldably urge the main diaphragm toward the orifice, and including an adjustment means operatively connected with the range spring to adjust the tension thereof,
   g) said housing means having metallic sealing relation with the main diaphragm and with said auxiliary pressure responsive metallic member.

2. The combination of claim 1 wherein said auxiliary pressure responsive means controls motion of the poppet toward or away from the orifice.

3. The combination of claim 2 wherein said auxiliary pressure responsive means is operatively connected with the poppet.

4. The combination of claim 3 wherein said auxiliary pressure responsive means comprises an auxiliary diaphragm.

5. The combination of claim 1 wherein said auxiliary pressure responsive means comprises an auxiliary bellows.

6. The combination of claim 1 wherein said poppet spring is an auxiliary spring operatively connected with the main diaphragm to yieldably urge the poppet toward the orifice.

7. The combination of claim 6 wherein the range spring and auxiliary spring are both at the same side of the main diaphragm.

8. The combination of claim 6 including means for adjusting the tension of the auxiliary spring.

9. The combination of claim 6 wherein the auxiliary spring is located within a space surrounded by the range spring which is a coil spring.

10. The combination of claim 4 including means for controlling the effective size of the auxiliary diaphragm.

11. The combination of claim 10 wherein said last named means comprises a washer variably engageable with the auxiliary diaphragm, a carrier for said washer, and an adjustable actuator to displace an inner diameter portion of the washer toward or away from the diaphragm.

12. The combination of claim 1 wherein said poppet comprises a stopper.

13. The combination of claim 12 wherein said auxiliary pressure responsive means controls movement of the stopper toward or away from the orifice.

14. The combination of claim 1 wherein said poppet is located at one side of the main diaphragm and is centrally connected therewith.

15. The combination of claim 1 wherein said auxiliary pressure responsive means controls the movement of the orifice toward or away from the poppet in response to changes in gas pressure at the upstream side of the orifice.

16. The combination of claim 15 wherein said auxiliary pressure responsive means comprises an annular auxiliary diaphragm.

17. The combination of claim 15 wherein said auxiliary pressure responsive means is a diaphragm that carries a seat facing the poppet and forming said orifice.

18. The combination of claim 6 including means for adjusting the tension of the auxiliary spring.

19. The combination of claim 1 including plug means removably connected with the housing in alignment with the poppet, and at the upstream side of the orifice.

20. The combination of claim 1 wherein said auxiliary pressure responsive means controls movement of the orifice toward or away from the poppet.

21. The combination of claim 30 wherein said auxiliary pressure responsive means comprises an annular diaphragm peripherally carried by said housing means, there being structure extending through the orifice to connect the stopper and main diaphragm.

22. The combination of claim 4 wherein said connection includes a transverse surface element, and a narrowed element engaging said surface, one of said elements carried by the poppet and the other of said elements carried by the main diaphragm, the poppet supported and centered by said auxiliary diaphragm, relative to the orifice.

23. The combination of claim 4 wherein said housing includes an annular body carrying said orifice, a cap removably attached to the annular body to support an outer annular portion of the main diaphragm therebetween, and a plug removably attached to the annular body to support an outer annular portion of the auxiliary diaphragm therebetween, the poppet supported axially by and between the main diaphragm and the auxiliary diaphragm for axial movement relative to the orifice, and laterally supported at and by the second diaphragm.

* * * * *